(12) United States Patent
Serizawa et al.

(10) Patent No.: US 8,186,749 B2
(45) Date of Patent: May 29, 2012

(54) COWL-TOP COVER

(75) Inventors: Daisuke Serizawa, Shizuoka (JP); Daisuke Takei, Shizuoka (JP)

(73) Assignee: Nihon Plast Co., Ltd., Shizuoka (JP)

( * ) Notice: Subject to any disclaimer, the term of this patent is extended or adjusted under 35 U.S.C. 154(b) by 0 days.

(21) Appl. No.: 12/870,384

(22) Filed: Aug. 27, 2010

(65) Prior Publication Data
US 2011/0049933 A1     Mar. 3, 2011

(30) Foreign Application Priority Data

Sep. 1, 2009   (JP) .................................. 2009-201633
Oct. 14, 2009  (JP) .................................. 2009-237182

(51) Int. Cl.
B62D 39/00  (2006.01)

(52) U.S. Cl. ...................................................... 296/192

(58) Field of Classification Search ............... 296/96.21, 296/187.04, 187.09, 192, 193.02, 201, 203.02
See application file for complete search history.

(56) References Cited

U.S. PATENT DOCUMENTS

| 4,938,526 | A | * | 7/1990 | Sannomiya et al. | ........... 296/192 |
| 5,108,146 | A |   | 4/1992 | Sheppard | ....................... 296/192 |
| 5,692,953 | A | * | 12/1997 | Bell et al. | ........................ 296/192 |
| 6,193,305 | B1 | * | 2/2001 | Takahashi | ...................... 296/192 |
| 6,565,148 | B1 | * | 5/2003 | Teramoto et al. | ............. 296/192 |
| 6,869,134 | B2 | * | 3/2005 | Kato et al. | ...................... 296/192 |
| 7,976,097 | B2 | * | 7/2011 | Watanabe et al. | ............. 296/192 |
| 7,988,223 | B2 | * | 8/2011 | Nakajima et al. | ............. 296/192 |
| 2009/0058139 | A1 | | 3/2009 | Izawa | ............................ 296/192 |

FOREIGN PATENT DOCUMENTS

| EP | 1 321 352 A2 | 6/2003 |
| JP | 08-119145 A | 5/1996 |
| JP | 2008-18848 | 1/2008 |
| JP | 2008-30632 A | 2/2008 |
| JP | 2008-201314 A | 9/2008 |
| JP | 2009-090787 A | 4/2009 |
| JP | 2009-274622 A | 11/2009 |
| JP | 2010-47136 A | 3/2010 |

* cited by examiner

Primary Examiner — Lori Lyjak
(74) Attorney, Agent, or Firm — Arent Fox LLP

(57) ABSTRACT

A cowl-top cover 6 is provided which is arranged across a lower end part 2a of a front window panel 2, a rear end part 3a of a front hood 3, and an upper end part 4a of a dash panel 4, of a vehicle. The cowl-top cover is formed by a seal loading portion 8 supporting the rear end part 3a of the front hood 3 with a sealing member 7, a longitudinal wall portion 9 formed so as to extend downwardly LWR from a rear end part 8a of the seal loading portion 8, and a panel loading portion 10a supported at the upper end part 4a of the dash panel 4. The longitudinal wall portion 9 is comprised of: a first oblique face portion 12 formed at a predetermined angle $\theta 1$ at a rear portion side PR on the basis of a perpendicular line 11 with the rear end part 8a of the seal loading portion 8 being a start point 5; and a second oblique face portion 13 bent and formed at a front side FR of the first oblique face portion 12. In this manner, even if a rear end part is deformed and moves to the lower side due to an impact load from above applied to an front hood, the cowl panel approaching the front hood never become rigid, and the load can be efficiently absorbed.

3 Claims, 11 Drawing Sheets

COWL-TOP COVER

CROSS-REFERENCE TO RELATED APPLICATIONS

This application claims priority of Japanese Patent Application No. 2009-201633 filed on Sep. 1, 2009 and Japanese Patent Application No. 2009-237182 filed on Oct. 14, 2009. The contents of this application are incorporated herein by reference in their entirety.

BACKGROUND OF THE INVENTION

1. Field of the Invention

The present invention relates to a cowl-top cover, and in particular to a cowl-top cover which is arranged across a lower end part of a front window panel, a front hood, and a dash panel, of a vehicle. Moreover in particular, the present invention relates to a construction in the engaging portion of a cowl-top cover engaging with the front end part of the front glass. A longitudinal direction, a vertical direction, and a widthwise direction of a vehicle body, which are employed in the present invention, are defined as those when a forward direction of a vehicle is oriented from a rear of the vehicle body on the basis of the forward direction in which the vehicle runs forward.

2. Description of the Related Art

As the related art, Japanese Patent Application Laid-open No. 2009-090787 discloses a cowl-top cover which is arranged across a lower end part of a front window panel, a front hood, and a dash panel, of a vehicle, wherein a sectional shape of a cowl panel is formed to be protruded forward so as to retain a rear end part of the front hood from underneath, and the front hood is retained via a sealing member fixedly provided at a tip end part of the cowl panel, for example.

However, in the above related art, if a vehicle bumps against a pedestrian or the like, the pedestrian or the like is pushed by the bumper, whereby an upper-body of the pedestrian or the like, in particular, his or her head part may bump against a rear end part of the front hood due to reaction. In this case, where the rear end part of the front hood is deformed and moves to a lower side due to an impact load having occurred to the rear end part of the front hood, the cowl panel retaining the rear end part of the front hood from underneath may become an obstruct. This has been a problem that remains unsolved conventionally.

In order to solve the above-described problem, the present invention provides a cowl-top cover, in which, if a rear end part of a front hood is deformed and moves to a lower side due to an impact load from above applied to the front hood, a cowl panel approaching the front hood never become rigid, and the load can be efficiently absorbed.

In addition, conventionally, a vehicle in which an engine room is arranged at a front part of the vehicle body allows a cowl-top cover to be provided between a front end part of a front glass and a rear end part of a front hood. The cowl-top cover is shaped to be extended over a vehicle widthwise direction; is adapted to cover between the front end part of the front glass and the rear end part of the front hood; and also functions as a decorative article or the like.

In other words, the cowl-top cover is adapted to close the inside of the engine room so as not to be visible from a driver's room. In addition, in order to prevent the entry of rainwater into the engine room, an engaging portion engaging with the front end part of the front glass is provided at the rear end part of the cowl-top cover, and a sealing member for sealing between the front end side and the rear end part of the front hood is provided at the front end side of the cowl-top cover.

The cowl-top cover is constructed by molding a material such as a synthetic resin, for example, and is constructed having a certain degree of rigidity. In particular, for a cowl-top cover constructed to be molded integrally with a cover main body portion from the rear end part to the front side of the cowl-top cover, the engaging portion engaging with the front end part of the front glass, requires the construction of the cover main body portion to have a certain degree of rigidity. On the other hand, the engaging portion engaging with the front end part of the front glass needs to have intimacy with the front glass, thus making it necessary to have a readily elastically deformable construction.

Japanese Patent Application Laid-open No. 8-119145 (hereinafter, referred to as "the related art document") proposes a cowl-top garnish mounting structure, for example, as a cowl-top cover adapted to construct an engaging portion molded integrally with a cover main body portion to be readily elastically deformable. FIG. 12 shows a longitudinal cross section of essential parts of the cowl-top garnish mounting structure in the longitudinal direction of a vehicle body while the cowl-top garnish mounting structure described in the related art document is introduced as the related art in comparison with the present invention.

As shown in FIG. 12, a molded portion 43A molded integrally with a cowl-top garnish 41A (corresponding to a lip portion in an engaging portion in the present specification) is provided at a rear end part 41aA of the cowl-top garnish 41A (corresponding to a cowl-top cover in the present specification). The molded portion 43A is constructed in such a shape that the rear end part 41aA of the cowl-top garnish 41A is extended toward a windshield 42A (corresponding to a front glass in the present specification).

In addition, between the rear end part 41aA of the cowl-top garnish 41A and the molded portion 43A, a sectional V-shaped recessed portion 44A is formed so as to make the molded portion 43A readily elastically deformable. When the cowl-top garnish 41A is placed in the vehicle body, the molded portion 43A is constructed to be elastically deformed in a direction in which the letter V of the recessed portion 44A is narrowed, in abutment with the front end part 42aA of the windshield 42A.

According to the invention described in the related art document, a bending moment is applied to a V-shaped bottom part in the recessed portion 44A at the time of mounting the cowl-top garnish 41A, and the molded portion 43A is elastically deformed in the direction in which the letter V of the recessed portion 44A is narrowed. Therefore, referring to an action of stress at the V-shaped bottom part, a compressive stress acts on an inner face side at the V-shaped bottom part, and a pulling stress acts on an outer face side thereof.

If the synthetic resin constituting the molded portion 43A cannot bear up the compressive stress or pulling stress acting on the V-shaped bottom part, there occurs a whitening phenomenon that a resin whitens, and deformation of the molded portion 43A is likely to occur. However, the physical value of the synthetic resin is lowered by resin whitening.

According to the invention described in the related art document, the V-shaped recessed portion 44A can be narrowed and closed at the time of mounting the cowl-top garnish 41A, thus allowing a whitened portion, which is exerted by deformation of the molded portion 43A, to be invisible from the outside. Therefore, the invention described in the related art is capable of preventing impairment of the appearance around the cowl-top garnish 41A, which may occur due to the fact that the whitened portion is visible from the outside of the cowl-top garnish 41A.

The invention described in the related art document has an advantage that the V-shaped recessed portion 44A is narrowed and closed, thereby allowing the whitened portion to be invisible from the outside of the cowl-top garnish 41A. While the whitened portion allows the physical value of the synthetic resin to be lowered, a construction is provided in such a fashion so as to be able to check whether or not the whitened portion occurs at the recessed portion 44A from the outside of the cowl-top garnish 41A.

In respect of the recessed portion 44A formed between the cowl-top garnish 41A and the molded portion 43A, when the V-shaped recessed portion is not precisely formed due to any reason such as dispersion at the time of molding, even if the molded portion 43A is deformed in a direction in which the V-shaped recessed portion 44A is closed at the time of mounting the cowl-top garnish 41A, the V-shaped recessed portion 44A is never closed in a tight-fit state, and is closed in a state in which a gap occurs. Through the gap having occurred while it is not closed in the tight-fit state, a whitened portion at the recessed portion 44A is allowed to be visible from the outside, impairing the appearance of the cowl-top garnish 41A.

According to the invention described in the related art document, the molded portion 43A is formed in such a shape that the cowl-top garnish 41A is extended as it is, on the side of the windshield 42A. In addition, a sectional V-shaped recessed portion 44A is formed at a boundary between the rear end part of the cowl-top garnish 41A and the molded portion 43A. In other words, an extension face to the side of the windshield 42A on a top face of the cowl-top garnish 41A is constructed to become a top face of the molded portion 43A as it is.

With such a construction, the thickness at the molded portion 43A is shaped to be gradually reduced from the side of recessed portion 44A at the molded portion 43A to the side of windshield 42A. In other words, the thickness at the molded portion 43A is formed in the shape of thickness which is thick on the side of recessed portion 44A and thinner toward the side of windshield 42A. Therefore, the invention described in the related art document is characterized in that a depth at the V-shaped recessed portion 44A is substantially equal to the thickness of the molded portion 43A on the side of the recessed portion 44A.

At the time of elastic deformation in a direction in which the letter V of the recessed portion 44A is narrowed, in comparison with a construction in a case in which the V-shaped depth at the recessed portion 44A is small, a greater bending moment acts on the bottom part at the V-shaped recessed portion 44A, in the one in a case where the V-shaped depth at the recessed portion 44A is large.

In the invention described in the related art document, the bottom part at the V-shaped recessed portion 44A is significantly bent, so that: a great stress acts on the V-shaped recessed portion 44A; and the whitened portion at the recessed portion 44A strongly appears. When the whitened portion strongly appears, at the recessed portion 44A, a resin-intrinsic physical value cannot be obtained, and in turn, a resilient force at the V-shaped recessed portion 44A lowers.

In the worst case, the V-shaped bottom part is cracked or broken, the V-shaped recessed portion 44A becomes a vulnerable site, and the strength of the molded portion 43A cannot be maintained.

In such a state, for example, in a case where a gap occurs between the molded portion 43A and the windshield 42A, the molded portion 43A cannot be restored in a direction in which such gap is eliminated, and in turn, a gap which is not closed exists as it is between the molded portion 43A and the windshield 42A. In addition, traceability of the molded portion 43A, attempting to maintain a state of intimate contact with the windshield 42A, is degraded.

Further, let us consider a virtual construction in which an identical bending load is applied to a rear end part and the side of the V-shaped side is fixed when a length from the V-shaped bottom to the rear end part of the molded portion 43A is identical, for example. In comparison with a construction in which the V-shaped depth at the recessed portion 44A is small, the amount of slackness at the rear end side of the molded portion 43A in this construction is smaller than that in which the V-shaped depth at the recessed portion 44A is large.

Therefore, in the invention described in the prior art document, in order to increase the amount of slackness at the rear end part side of the molded portion 43A for the sake of bringing into intimate contact with the windshield 42A, a significant pressing force must be applied to the rear end part side of the molded portion 43A. In addition, if the amount of slackness is small at the rear end part side of the molded portion 43A, a region of elastic deformation at the molded portion 43A is formed to be small.

As a result, the amount of deformation at the molded portion 43A significantly depends upon deformation at the V-shaped recessed portion 44A. Moreover, if it does, a stress acting on the recessed portion 44A increases, and in turn, whitening strongly appears at the recessed portion 44A.

The present invention aims to provide a cowl-top cover in which: when the cowl-top cover is installed between a front glass and a front hood, a region of elastic deformation at a lip portion in intimate contact with a front glass can be formed to be large; and when the lip portion is elastically deformed, a whitened site hardly appears at the cowl-top cover and the elastically deformed lip portion can be readily restored.

SUMMARY OF THE INVENTION

The above-described object of the present invention can be achieved by a cowl-top cover according to first to eighth aspects of the invention.

The first aspect of the present invention is directed to a cowl-top cover, which is arranged across a lower end part of a front window panel, a rear end part of a front hood, and an upper end part of a dash panel, of a vehicle, wherein: the cowl-top cover is formed by at least a seal loading portion supporting the rear end part of the front hood with a sealing member, a longitudinal wall portion formed so as to extend downwardly from a rear end part of the seal loading portion, and a panel loading portion supported at the upper end part of the dash panel; and the longitudinal wall portion is comprised of: a first oblique face portion formed at a predetermined angle at a rear portion side on a basis of a perpendicular line with the rear end part of the seal loading portion being a start point; and a second oblique face portion bent and formed at a front side of the first oblique face portion.

The second aspect of the present invention is characterized in that the longitudinal wall portion according to the first aspect of the present invention is uniform in a vertical dimension between the rear end part of the seal loading portion and a bent part of the first oblique face portion and the second oblique face portion.

The third aspect of the present invention is characterized in that the second oblique face portion according to the first or second aspect of the present invention is 80 degrees or more and 100 degrees or less relative to the first oblique face portion.

The fourth aspect of the present invention is directed to a cowl-top cover which engages with a front end part of a front glass arranged at a front part of a vehicle body, which covers between the front end part and a rear end part of a front hood covering a top opening of a front compartment of a vehicle, and which is extended over a vehicle widthwise direction, wherein: an engaging portion engaging with the front end part of the front glass, formed at a rear end part of the cowl-top cover, has a general plate thickness portion in a longitudinal direction of the vehicle body, a lip portion extending from the general plate thickness portion, and a thin portion formed at a boundary portion between the general plate thickness portion and the lip portion; the respective back face side of the general plate thickness portion, the thin portion, and the lip portion is constructed as a step-free glass opposite face at an interval leading to a glass abutment portion with the front glass at the lip portion; thickness at the lip portion is formed to be smaller than thickness at the general plate thickness portion, whereas thickness at the thin portion is formed to be smaller than thickness at the lip portion excluding a rear end part of the lip portion; and a sectional shape of the thin portion in the longitudinal direction of the vehicle body is formed in an arc-like curved-face shape.

The fifth aspect of the present invention is characterized in that: the general plate thickness portion and the lip portion according to the fourth aspect of the present invention are formed so that, in the longitudinal direction of the vehicle body, a virtual extension face formed when a surface of the lip portion is extended to a front face side of the general plate thickness portion in excess of the thin portion is obtained as a step difference face, thickness of which is smaller than thickness on a surface of the general plate thickness portion.

The sixth aspect of the present invention is characterized in that: the cowl-top cover according to the fourth or fifth aspects of the present invention is molded with an olefin-based resin composition having a bending modulus of elasticity of 1,500 to 3,000 MPa, an izod impact value of which is 5 Kj/m$^2$ or more under a measurement condition of 23 degrees centigrade.

The seventh aspect of the present invention is characterized in that: the arc-like curved-face shape according to the fourth to sixth aspects of the present invention is an elliptical arc face.

The eighth aspect of the present invention is characterized in that: the arc-like curved-face shape according to the fourth to sixth aspects of the present invention is a horizontal oblong arc face.

According to the first aspect of the present invention, there is provided a cowl-top cover, which is arranged across a lower end part of a front window panel, a rear end part of a front hood, and an upper end part of a dash panel, of a vehicle, wherein: the cowl-top cover is formed by at least a seal loading portion supporting the rear end part of the front hood with a sealing member, a longitudinal wall portion formed so as to extend downwardly from a rear end part of the seal loading portion, and a panel loading portion supported at the upper end part of the dash panel; and the longitudinal wall portion is comprised of: a first oblique face portion formed at a predetermined angle at a rear portion side on a basis of a perpendicular line with the rear end part of the seal loading portion being a start point; and a second oblique face portion bent and formed at a front side of the first oblique face portion. In this manner, the present invention attains an advantageous effect that: an impact load applied from above to beneath of the rear end part of the front hood is applied to a bent part between the first oblique face portion and the second oblique face portion; and the bent part is elastically deformed or plastically deformed, whereby the seal loading portion moves downward while maintaining an initial state, so that the longitudinal wall portion never become rigid, and the impact load applied from the front hood can be efficiently absorbed.

According to the second aspect of the present invention, the present invention attains an advantageous effect that longitudinal wall portion is uniform in the vertical dimension between the rear end part of the seal loading portion and the bent part of the first oblique face portion and the second oblique face portion, whereby even if a pedestrian or the like, although not shown, bumps against anywhere from the lateral center to the lateral end part of the front hood, an absorption level of the impact load can be equally retained.

According to the third aspect of the present invention, the present invention attains an advantageous effect that the second oblique face portion is oblique at an angle of 80 degrees or more and 100 or less relative to the first oblique face portion, whereby under the impact load, the second oblique face portion 13 is readily deformed downward, thus enabling reliable impact absorption.

According to the fourth aspect of the present invention, in respect of a constituent element of an engaging portion engaging a front end part of a front glass, the respective back face side of the general plate thickness portion, a thin portion and a lip portion constituting the engaging portion is constituted as a step-free glass opposite face at an interval leading to a glass abutment portion with the front glass at the lip portion. In addition, the thickness is thinly formed in sequential order of the general plate thickness portion, the lip portion, and thin portion, and the sectional shape in the longitudinal direction of a vehicle body at the thin portion is formed in an arc-like curved-face shape.

In particular, the sectional shape of the thin portion is formed in an arc-like curved-face shape, and the back face side of the general plate thickness portion, the thin portion, and the lip portion, constituting the engaging portion, is formed as a step-free glass opposite face. The engaging portion is thus constructed, so that: the lip portion can be elastically deformed all over a full length of the lip portion in the longitudinal direction of the vehicle; and the thin portion can be elastically deformed so as to reduce a curvature radius of the arc-like curved-face shape.

Therefore, when the lip portion is elastically deformed in abutment with the front glass, the region of a stress at the lip portion and the thin portion can be constructed to be large by a step-free glass opposite face and an arc-like curved face of the thin portion. In addition, the stress can be dispersedly applied to the entire face of the lip portion and the thin portion. Moreover, when the lip portion and thin portion are elastically deformed, an excessive stress adapted to allow whitening of a resin constituting a cowl-top cover can be prevented from acting on the lip portion and thin portion.

In this way, the physical value of the resin constituting the cowl-top cover can be prevented from lowering due to an occurrence of whitening, and the resin-intrinsic performance can be satisfied. In addition, the cowl-top cover can be appropriately used over a long period of time.

The lip portion is deformed and is brought into contact with the front end part of the front glass without whitening of the resin due to elastic deformation at the lip portion and thin portion, so that intimacy relative to the front glass, of the engaging portion, can be remarkably improved.

In this manner, with sufficient flexibility being imparted to the lip portion, the lip portion can be reliably brought into crimp-contact with the front glass so as to be able to reliably prevent the entry of foreign matter or water, etc. through the lip portion.

In addition, in the present invention, a large stress to an extent such that whitening is allowed to occur can be adapted so as not to act on the lip portion and the thin portion, and the lip portion and the thin portion can be elastically deformed without causing whitening. Therefore, the resilient force at the lip portion can be increased, and intimacy between the lip portion and the front glass can also be maintained over a long period of time.

Therefore, intimacy of the lip portion relative to the front glass can be improved, and the quality of the cowl-top cover can be remarkably improved. Further, a whitened portion is disallowed to appear on the cowl-top cover, so that the appearance of the cowl-top cover can be appropriately maintained.

Moreover, even if the front glass vibrates due to an adverse effect arising from a vehicle body or even if the cowl-top cover vibrates, an elastic force at the lip portion is maintained so that the lip portion hardly chatters. Thus, noise or the like generated between the lip portion and the front glass can be restrained, and noise vibration proofing performance can be improved. Further, at the time of vehicle washing or the like, the lip portion can be prevented from being curled-up, and the appearance of the cowl-top cover can be prevented from being impaired.

According to the fifth aspect of the present invention, the present invention allows the general plate thickness portion and the lip potion to be formed so that a virtual extension face appearing when a surface of the lip portion is extended to a front face side of the general plate thickness portion in excess of the thin portion becomes a step height face, thickness of which is smaller than that of the surface of the general plate thickness portion, in the longitudinal direction of a vehicle body.

With such a construction, the lip portion per se can be significantly deformed, and the quantity of elastic deformation at the rear end part of the lip portion can be increased. Moreover, even if the rear end part of the lip portion is significantly elastically deformed, an occurrence of whitening at the lip portion can be restrained, and further, the resilient force at the lip portion can be significantly produced.

In addition, the emergence of a whitened site can be restrained so as to be thereby able to prevent impairment of the appearance relative to the cowl-top cover and to maintain intimacy between the lip portion and the front glass over a long period of time.

According to the sixth aspect of the present invention, the present invention may employ an olefin-based resin composition having a bending modulus of elasticity of 1,500 to 3,000 MPa to mold the cowl-top cover, an izod impact value of which is 5 Kj/m² or more under a measurement condition of 23 degrees centigrade. The cowl-top cover is molded using the olefin-based resin composition having such physical value, whereby the above-described advantageous effect of the present invention can be attained in a further better state.

According to the seventh and eighth aspects of the present invention, an elliptical arc face, a horizontal oblong arc face, or a perfect-circle arc face can be constructed as an arc-like curved-face shape at the thin portion. The arc-like curved-face shape at the thin portion is formed in these shapes so as to be thereby able to prevent a stress from concentrating at a partial site of the thin portion and to efficiently achieve dispersion of the stress. In addition, when the cowl-top cover is installed between the front glass and the front hood, a whitened site emerging at the thin portion can be preferably restrained.

DESCRIPTION OF THE PREFERRED EMBODIMENTS

Figure 1:
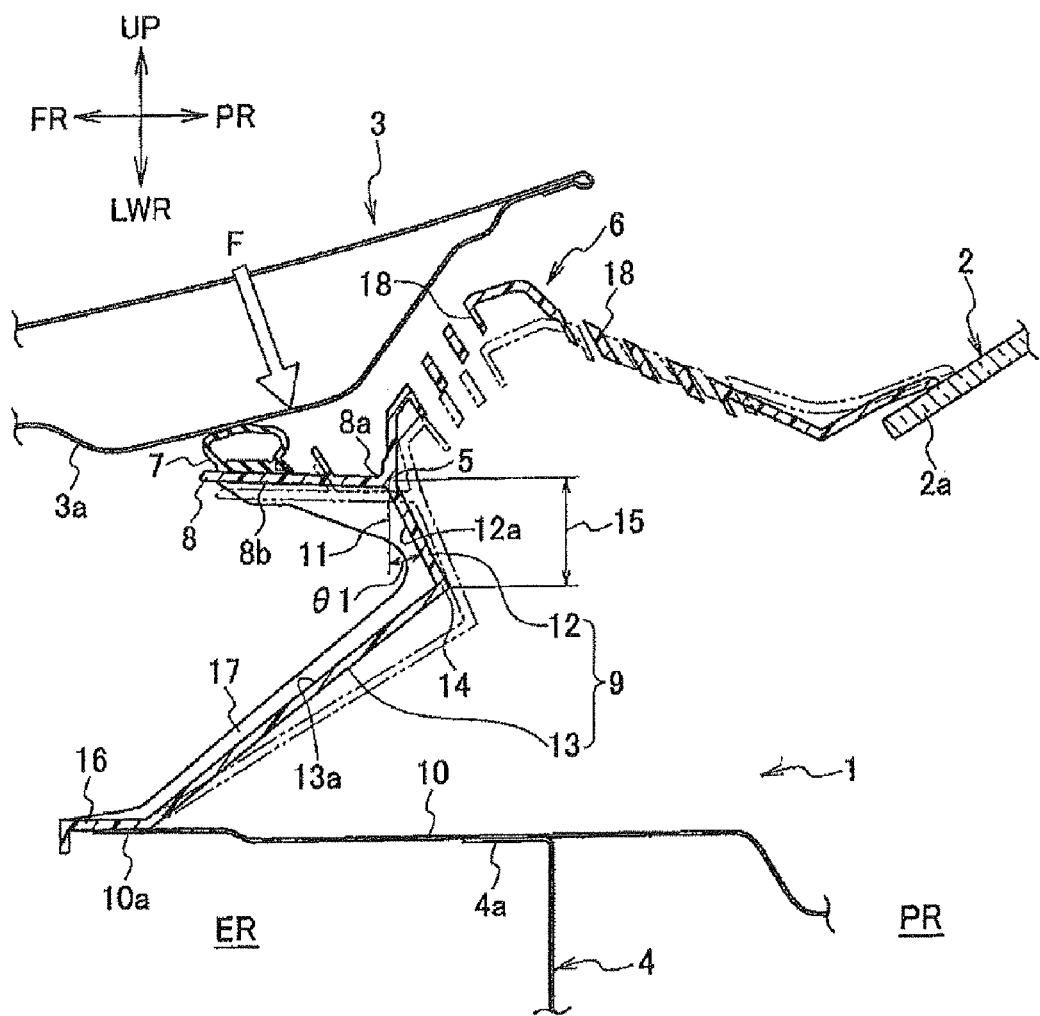
FIG. 1 is a sectional view taken along the line SA-SA of FIG. 2, showing a vehicle-mountable cowl structure, according to a first embodiment of the present invention.

Hereinafter, preferred a first to fifth embodiments of the present invention will be specifically described, referring to the accompanying drawings. A cowl-top cover according to the present invention may be formed in any shape or construction other than those described hereinafter, as long as it can solve the problem of the present invention. Therefore, the present invention is not limitative to the embodiments described below, and various modifications can occur.

Hereinafter, the preferred the first and second embodiments of the present invention will be described in detail. It is an object of the present invention to provide a vehicle-mountable cowl structure, in which, if a rear end part of a front hood is deformed and moves to a lower side due to an impact load from above, applied to the front hood, a cowl panel approaching the front hood never become rigid, and the load can be efficiently absorbed. The above-described object has been achieved in such a fashion that:

a cowl-top cover is provided which is arranged across a lower end part of a front panel, a rear end part of a front hood, and an upper end part of a dash panel, of a vehicle.

the cowl-top cover is formed by a seal loading portion supporting the rear end part of the front hood with a sealing member, a longitudinal wall portion formed so as to extend downwardly from a rear end part of the seal loading portion, and a panel loading portion supported at the upper end part of the dash panel; and the longitudinal wall portion is comprised of: a first oblique face portion formed at a predetermined angle at a rear portion side on the basis of a perpendicular line with the rear end part of the seal loading portion being a start point; and a second oblique face portion bent and formed at a front side of the first oblique face portion.

Hereinafter, embodiments of the present invention will be described referring to the drawings.

(First Embodiment)

A structure according to the first embodiment of the present invention will be described referring to FIGS. 1 to 3. A vehicle-mountable cowl structure 1 of the first embodiment is a synthetic resin-based cowl-top cover 6, which is arranged across a lower end part 2a of a vehicle's front window panel 2; a rear end part 3a of a front hood 3, covering an engine room ER from above; and an upper end part 4a of a dash panel 4 partitioning between the engine room ER and a passenger room PR.

The cowl-top cover 6 is formed by a seal loading portion 8 supported via a sealing member 7 for interrupting offensive smell in the engine room ER in contact with the rear end part 3a of the front hood 3 (The sealing member 7 of FIG. 1 is shown as the one before crimp-contacted by the front hood 3 closing the engine room ER); a longitudinal wall portion 9 formed so as to extend downwardly LWR from a rear end part 8a of the seal loading portion 8; and a panel loading portion 10a at a front end of a vehicle body panel 10 supported at the upper end part 4a of the dash panel 4.

The longitudinal wall portion 9 is made of: a first oblique face portion 12 formed at a predetermined angle $\theta 1$ at the rear side RR on the basis of a perpendicular line 11 with the rear end part 8a of the seal loading portion 8, being a start point 5; and a second oblique face portion 13 bent and formed at a front side FR from a lower end part of the first oblique face portion 12. Reference numeral 14 designates a bent part of the second oblique face portion 13, formed at the lower end part of the first oblique face portion 12.

In addition, in respect of a vertical dimension 15 between the rear end part 8a of the seal loading portion 8 and the bent part 14 of the first oblique face portion 12 and the second oblique face portion 13, the longitudinal wall portion 9 is uniform at the lateral center part of a vehicle or at the lateral end part of the vehicle.

The angle $\theta 1$ at the lateral center part of the vehicle of the first oblique face portion 12 forms about 45 degrees relative to the perpendicular line 11 and the angle $\theta 1$ at the lateral end part of the vehicle forms 25 degrees relative to the perpendicular line 11. In addition, the angle $\theta 1$ at the lateral end part of the vehicle can be appropriately set at an angle which is smaller than 45 degrees relative to the perpendicular line 11. In addition, the angle $\theta 1$ may be a predetermined angle at the lateral center part of the vehicle and at the lateral end part of the vehicle.

Further, the second oblique face portion 13 is bent and formed at the front side FR relative to the first oblique face portion 12 at an angle $\theta 2$ of 80 degrees or more to 100 degrees or less. A horizontal face portion 16, loaded on the panel loading portion 10a at the front end of the vehicle body panel 10, is formed at the lower end part of the second oblique face portion 13. Reference numeral 17 designates a reinforce rib which is continuously erected across a lower face part 8b of the seal loading portion 8, a front face part 12a of the first oblique face portion 12, and a front face part 13a of the second oblique face portion 13.

Figure 2:
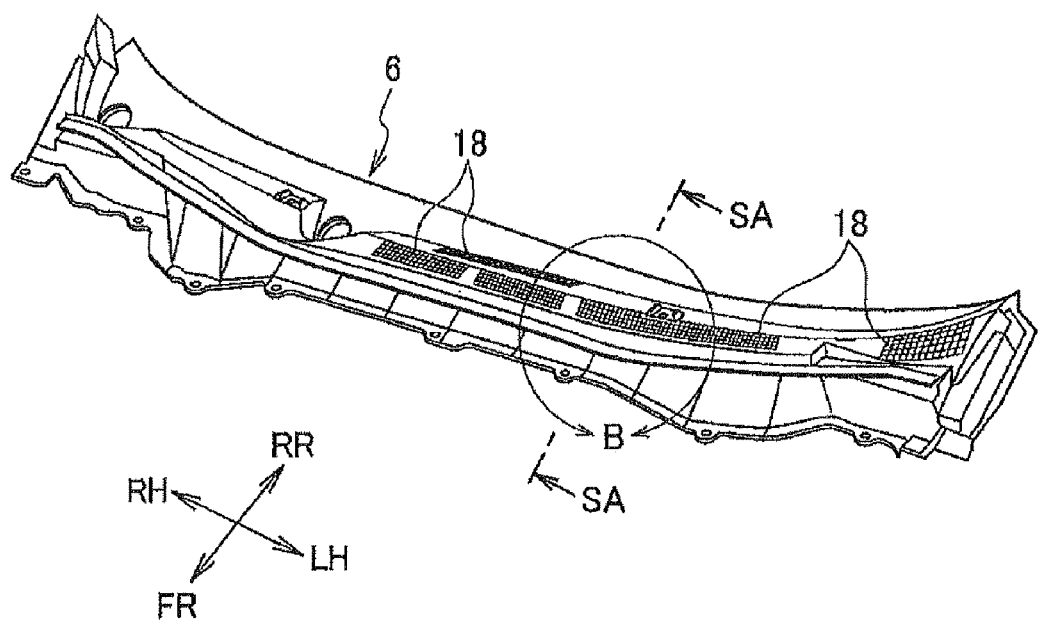
FIG. 2 is a perspective view showing a cowl-top cover of FIG. 1.
Figure 3:
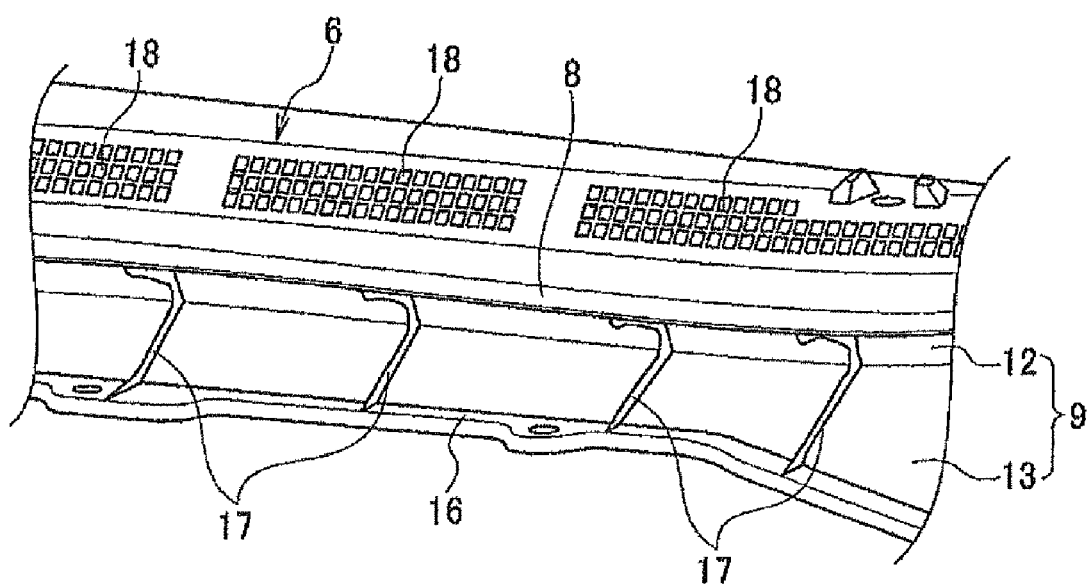
FIG. 3 is an enlarged perspective view of the portion B of FIG. 2.

The cowl-top cover 6, as shown in FIG. 2, is elongated in a lateral direction LH or RH, and is integrally formed; and an atmospheric air intake opening 18 is formed in the shape of a cleat.

Next, advantageous effects of the first embodiment will be described.

A cowl-top cover 6 is provided which is arranged across a lower end part 2a of a front window panel 2, a rear end part 3a of a front hood 3, of a vehicle and an upper end part 4a of a dash panel 4. The cowl-top cover 6 is formed by at least a seal loading portion 8 supporting the rear end part 3a of the front hood 3 with a sealing member 7, a longitudinal wall portion 9 formed so as to extend downwardly LWR from a rear end part 8a of the seal loading portion 8, and a panel loading portion 10a supported at the upper end part 4a of the dash panel 4. The longitudinal wall portion 9 is comprised of: a first oblique face portion 12 formed at a predetermined angle $\theta 1$ at a rear portion side RR on a basis of a perpendicular line 11 with the rear end part 8a of the seal loading portion 8 being a start point 5; and a second oblique face portion 13 bent and formed at a front side FR of the first oblique face portion 12. In this manner, the present invention attains an advantageous effect that: an impact load F applied from above to beneath of the rear end part 3a of the front hood 3 is applied to a bent part 14 between the first oblique face portion 12 and the second oblique face portion 13; and the bent part 14 is elastically deformed or plastically deformed as indicated by the double-dotted chain line of FIG. 1, whereby the seal loading portion 8 moves to the lower side LWR while maintaining an initial state, namely, the horizontal state as shown in FIG. 1, so that the longitudinal wall portion 9 never become rigid, and the impact load F applied from the front hood 3 can be efficiently absorbed.

In addition, the present invention attains an advantageous effect that longitudinal wall portion 9 is uniform in the vertical dimension 15 between the rear end part 8a of the seal loading portion 8 and the bent part 14 of the first oblique face portion 12 and the second oblique face portion 13, whereby even if a pedestrian or the like, although not shown, bumps against anywhere from the lateral center to the lateral end part of the front hood 3, an absorption level of the impact load F can be equally retained.

Further, the present invention attains an advantageous effect that the first oblique face portion 12 allows a lateral center part of a vehicle to be oriented to the rear side RR at an angle of about 45 degrees relative to the perpendicular line 11 and a lateral end part of the vehicle to be oriented to the rear side RR at an angle of 25 degrees relative to the perpendicular line 11, whereby in a case where a pedestrian or the like, although not shown, bumps against the lateral center part of the vehicle, dispersion of the impact force is large and in a case where a pedestrian or the like, although not shown, bumps against the lateral end part of the vehicle, dispersion of the impact force is small, so that the angle $\theta 1$ relative to the perpendicular line 11 of the first oblique face portion 12 is different, whereas the impact absorption value is on the substantially same level.

Furthermore, the present invention attains an advantageous effect that the second oblique face portion 13 is oblique at an angle of 80 degrees or more and 100 or less relative to the first oblique face portion 12, and is preferably substantially shaped to be right-angled, whereby under the impact load F, the second oblique face portion 13 is readily deformed downward, thus enabling reliable impact absorption. In a case where the angle formed by the second oblique face portion 13 relative to the first oblique portion 12 is smaller than 80 degrees, the bent part 14 significantly protrudes to the rear side RR of the vehicle, and the degree of freedom on the layout of the vehicle is limited. In addition, in a case where the angle formed by the second oblique face portion 13 is greater than 100 degrees, the second oblique face portion 13 tends to become rigid at the time of impact load input; downward movement of the second oblique face portion 13 is prevented; and an impact absorption effect is prone to lower.

Still furthermore, the present invention attains an advantageous effect that a reinforce rib 17 is formed at the first oblique face portion 12 and the second oblique face portion 13, whereby deformation of the cowl-top cover 16 never occurs even in the event of snow accumulation or hand movement on the front hood 3 or the like, and predetermined rigidity can be imparted.

(Second Embodiment)

A structure according to a second embodiment of the present invention will be described referring to FIG. 4. A vehicle-mountable cowl structure 20 of the second embodiment is a synthetic resin-based cowl-top cover 21, which is arranged across a lower end part 2a of a vehicle's front window panel 2, a rear end part 3a of a front hood 3, covering an engine room ER from above, and an upper end part 4a of a dash panel 4 partitioning between the engine room ER and a passenger room PR.

Figure 4:
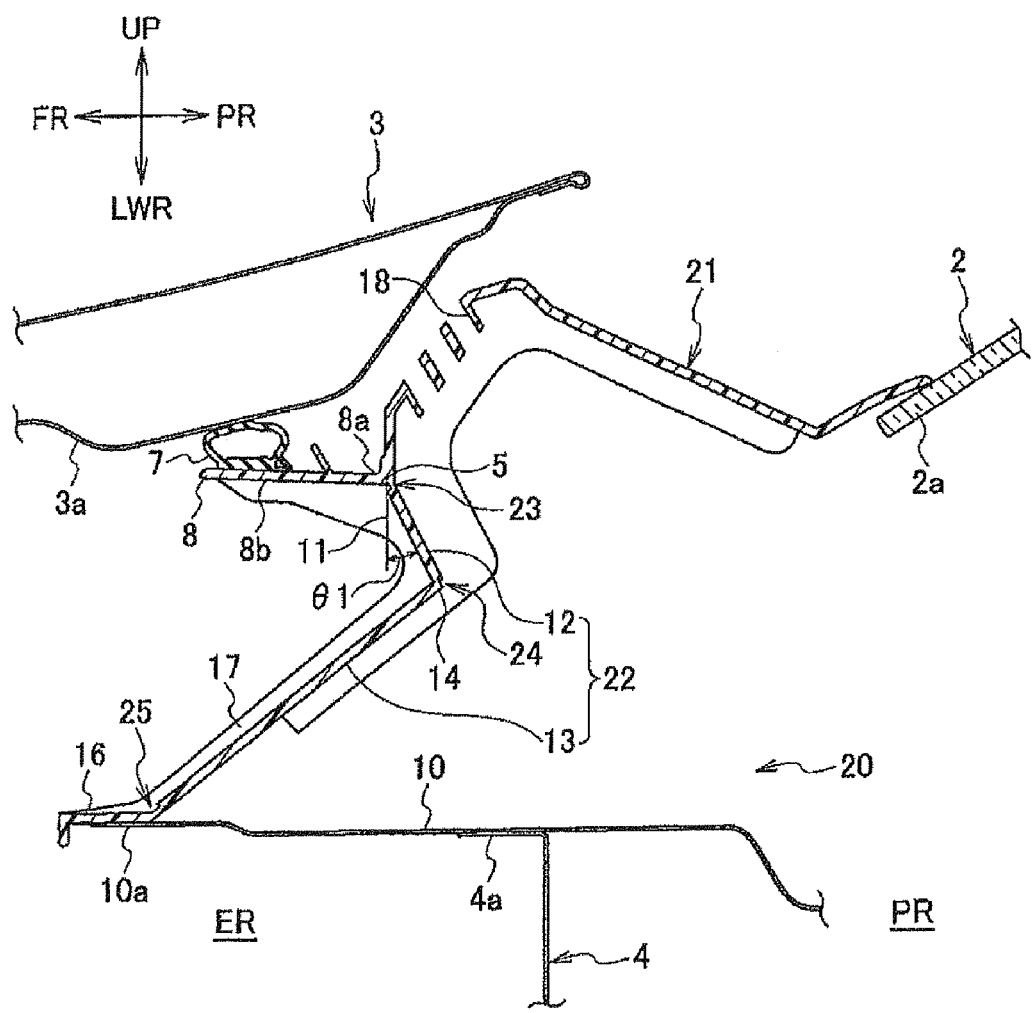
FIG. 4 is a sectional view equivalent to FIG. 1 according to a second embodiment of the present invention.

The cowl-top cover 21 is formed by: a seal loading portion 8 supported via a sealing member 7 for interrupting the offensive smell in the engine room ER in contact with the rear end part 3a of the front hood 3 (The sealing member 7 of FIG. 4 is shown as the one before crimp-contacted by the front hood 3 closing the engine room ER.); a longitudinal wall portion 22 formed so as to extend downwardly LWR from a rear end part 8a of the seal loading portion 8; and a panel loading portion 10a body panel 10 supported at the upper end part 4a of the dash panel 4.

The longitudinal wall portion 22 is made of: a first oblique face portion 12 formed at a predetermined angle θ1 at the rear side RR on the basis of the perpendicular line 11 with the rear end part 8a of the seal loading portion 8 being the start point 5; a second oblique face portion 13 bent and formed at the front side FR from the lower end part of the first oblique face portion 12; and a bent part 14 bent and formed at the lower end part of the first oblique face portion 12 and the upper end part of the second oblique face portion 13. Thin vulnerable sites 23, 24, 25 enclosed in the circles are formed, respectively, between the rear end part 8a of the seal loading portion 8 and the upper end part of the first oblique face portion 12 and between the lower end part of the second oblique face portion 13 and the horizontal face portion 16 and the bent part 14.

Next, an advantageous effect of the second embodiment will be described.

The present invention attains the advantageous effect that the vulnerable sites 23, 24, 25 are formed at the longitudinal wall portion 22, whereby in a case where the impact F is applied to the front hood 3 by a pedestrian or the like, the quantity of movement to the lower side KWR is increased by the vulnerable sites 23, 24, 25, thus enabling reliable impact absorption.

INDUSTRIAL APPLICABILITY

The term "pedestrian(s)" used in the first and second embodiments conceptually includes a case in which a person(s) is (are) walking or jogging on road or a case in which the subject(s) is (are) an animal(s) other than a human being, such as deer.

Figure 6:
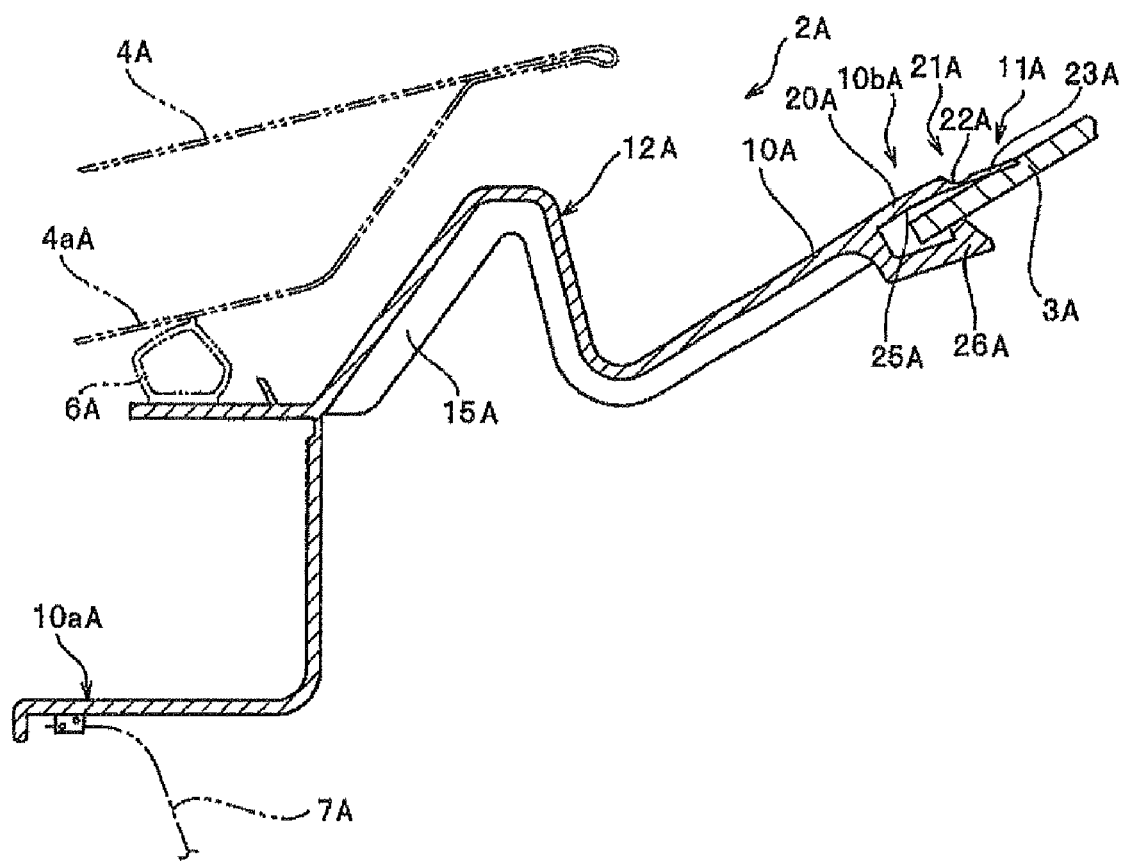
FIG. 6 is a sectional view taken along the line II-II of FIG. 5, according to the third embodiment.

Next, the preferred the third to fifth embodiments of the present invention will be described in detail. As shown in FIG. 6, a cowl-top cover which is capable of: constituting a large area, when a lip portion is elastically deformed; preventing an occurrence of whitening at the time of elastic deformation of the lip portion; and readily restoring the elastically deformed lip portion. A step-free glass opposite face 25A is constituted at a back face side of a general plate thickness portion 20A, a thin portion 21A, and a lip portion 23A, and the thin portion 21A is formed at a boundary portion between the general plate thickness portion 20A and the lip portion 23A in such a manner that a sectional shape in a longitudinal direction of a vehicle body 1A is obtained as an arc-like curved face 22A. When the lip portion 23A is deformed to come into contact with a front glass 3A, the glass opposite face 25A and the thin portion 21A are elastically deformed while they are entirely deformed, and an occurrence of whitening at the thin portion 21A and the lip portion 23A is prevented.

(Third Embodiment)

Figure 5:
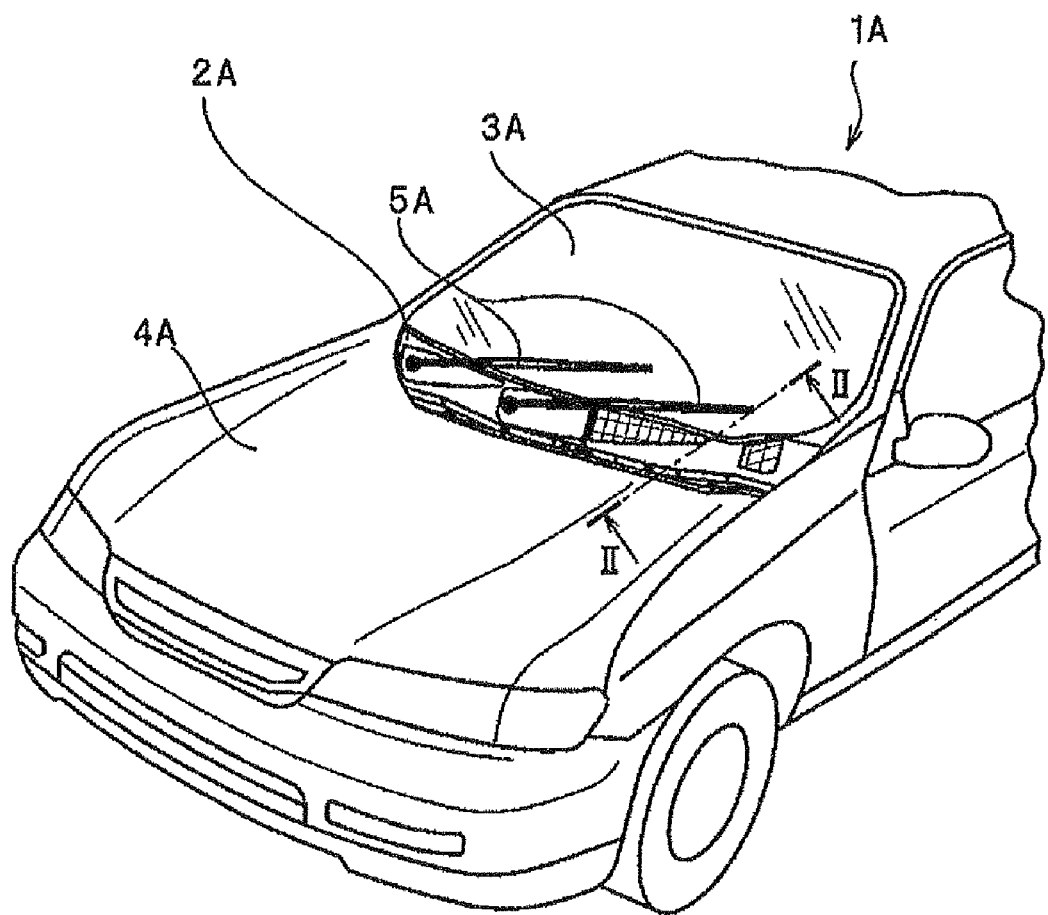
FIG. 5 is a perspective view of a vehicle body front part according to any one of third to fifth embodiments.

A front end part of a front glass 3A, shown in the perspective view of a vehicle body front part in FIG. 5, is supported by a cowl-top cover 2A. In other words, as shown in FIG. 6, the front end part of the front glass 3A is supported by an engaging portion 11A of the cowl-top cover 2A. In addition, as shown in FIG. 5, a top part of a front compartment forming an engine room or the like, although not shown, is covered with a front hood 4A, and the front hood 4A is turnably borne at a front end part or a rear end part of the front compartment, so that a rear end part side or a front end part side of the front hood 4A can open.

A wiper 5A for appropriately maintaining a field of view of the front glass 3A covered with rainwater or snowfall and the like is provided at the front end part side of the front glass 3A, and a motor for driving the wiper 5A is accommodated in a space covered with the cowl-top cover 2A.

As shown in FIG. 6, the cowl-top cover 2A is constructed having a cover main body 10A, and an engaging portion 11A engaging with the front end part of the front glass 3A. A front end part 10aA of the cover main body portion 10A is fixed to a cowl-top panel 7A, and the engaging portion 11A formed at a rear end part 10bA engages with the front end part of the front glass 3A at a predetermined lap quantity.

The engaging portion 11A is constructed having: a site arranged at a front face side of the front glass 3A made of a general plate thickness portion 20A, a lip portion 23A, and a thin portion 21A formed between the general plate thickness portion 20A and the lip portion 23A; and a glass catching claw 26A engaging with the back face side of the front glass 3A.

Figure 7:
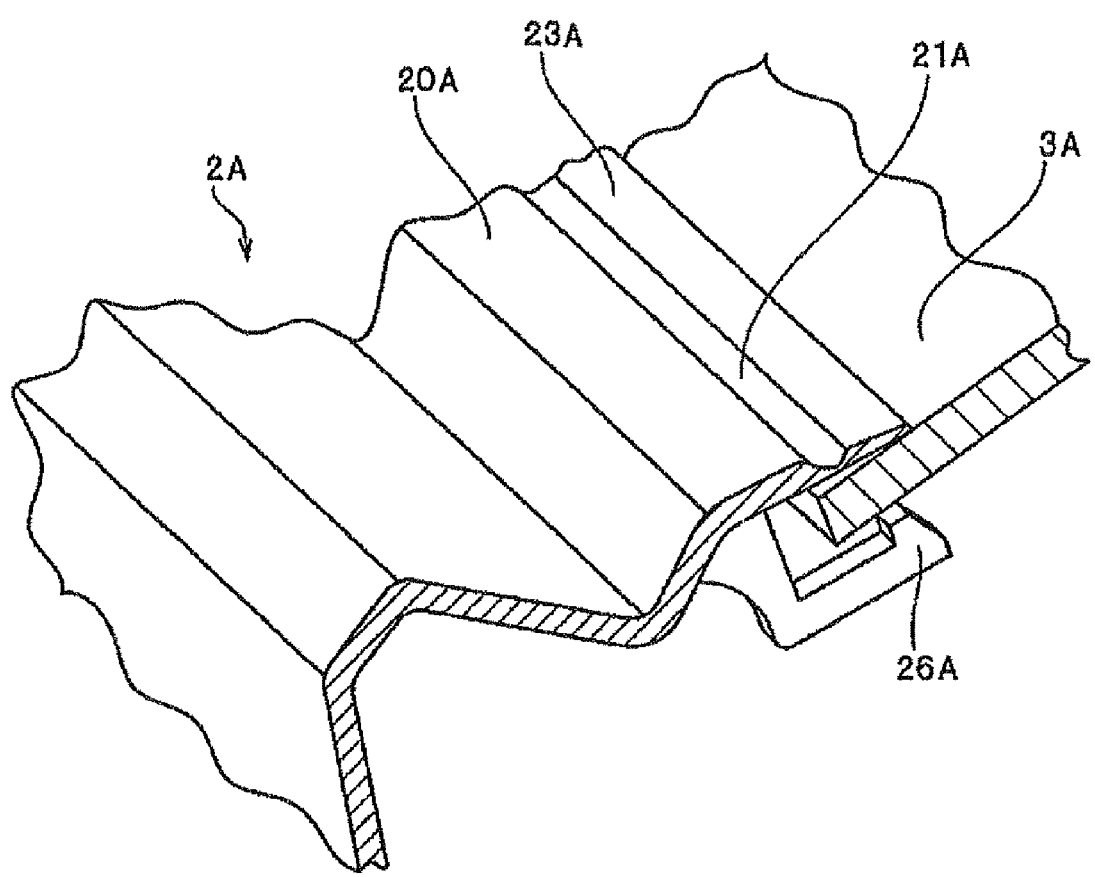
FIG. 7 is a perspective view showing essential parts of an engaging portion, according to the third embodiment.

The front end part of the front glass 3A, as shown in FIG. 7, is constructed to engage with the engaging portion 11A while being held between the site arranged at the front face side of the front glass 3A and the glass catching claw 26A. The site arranged at the front face side of the front glass 3A is provided along the vehicle widthwise direction of the cowl-top cover 2A, and the glass catching claw 26A is provided in plurality at an appropriate site at the back face side of the cowl-top cover 2A in the vehicle widthwise direction.

The cowl-top cover 2A can be constructed by integrally molding a resin material, and the engaging portion 11A is constructed by molding a resin material integrally with the cover main body portion 10A. As the resin material constituting the cowl-top cover 2A, it is desirable to employ an olefin-based resin composition having a bending modulus of elasticity of 1,500 to 3,000 MPa, an izod impact value of which is 5 Kj/m$^2$ or more under a measurement condition of 23 degrees centigrade, without being limitative thereto.

As shown in FIG. 6, a front hood reinforcement 4aA is mounted to the back face side of the front hood 4A, and with the front hood 4A being closed, at the front end side of the cover main body portion 10A of the cowl-top cover 2A, the front hood reinforcement 4aA is brought into crimp-contact with a sealing member 6A which is provided along the vehicle widthwise direction. In addition, the sealing member 6A is adapted to prevent the entry of rainwater or the like into the front compartment.

The front end part 10aA extended downward is formed at the front end side of the cover main body portion 10A, and the bottom face side of the front end part 10aA is adapted to be supported on the cowl-top panel 7A. At the cover main body portion 10A, a protrusive portion 12A protruding upward in the longitudinal direction of a vehicle body 1A (see FIG. 5) is provided at least at one or more sites in the vehicle widthwise direction.

A rib 15A for reinforcing the protrusive portion 12A, which is formed along the longitudinal direction of the vehicle body 1A (see FIG. 5), is provided at the back face side of the protrusive portion 12A. The protrusive portion 12A can be provided at least at one or more sites in the vehicle widthwise direction. The rib 15A that is formed in one protrusive portion 12A can also be formed by at least one or more stripes in the vehicle widthwise direction. It is to be noted that in FIG. 7, the rib 15A is not shown.

Figure 8:
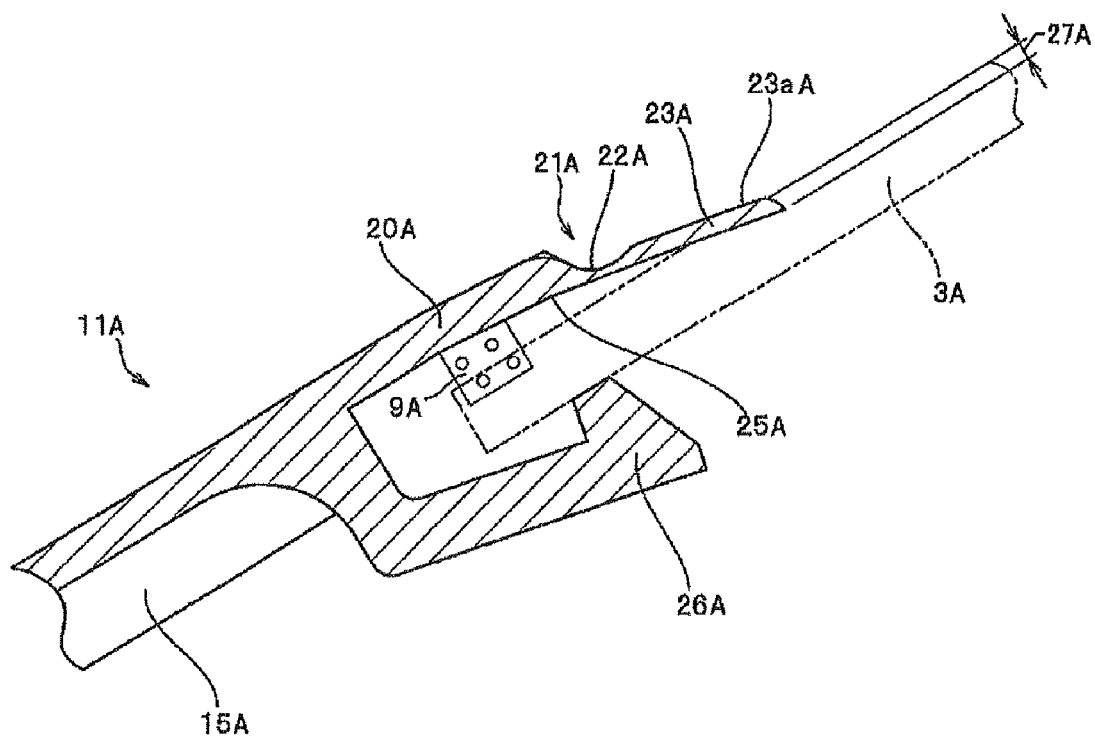
FIG. 8 is an enlarged sectional view showing a state of engagement between the engaging portion and a front glass, according to the third embodiment.

As shown in the enlarged view of FIG. 8, at the back face side of a general plate thickness portion 20A, a sealing member 9A for sealing a gap relative to the front glass 3A is provided along the vehicle widthwise direction. The sealing member 9A can prevent the rainwater or the like having entered between the lip portion 23A and the front glass 3A from entry into the front compartment.

Figure 9:
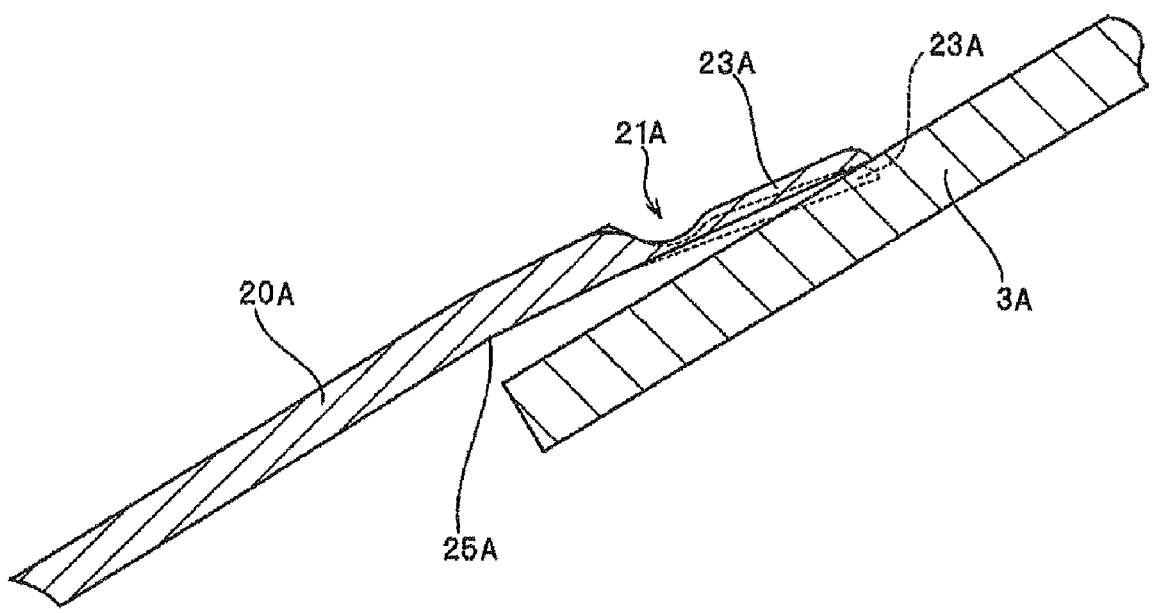
FIG. 9 is an enlarged sectional view of essential parts showing a state in which a lip portion is allowed to abut with the front glass, according to the third embodiment.

As shown in the enlarged views of FIGS. 8 and 9, respectively, at the engaging portion 11A, the back face side of the general plate thickness portion 20A, thin portion 21A, and lip portion 23A, constituting the site arranged at the front face side of the front glass 3A, is constructed as a step-free glass opposite face 25A, leading up to an abutment portion with the front glass 3A at the lip portion 23A.

FIG. 9 shows, by way of dotted line, a state in which the lip portion 23A is not in abutment with the front face side of the front glass 3A, i.e., a state before the cowl-top cover 2A is mounted to the vehicle body 1A (see FIG. 5). The figure also shows, by way of solid line, a state in which the lip portion 23A is in abutment with the front face side of the front glass 3A after the cowl-top cover 2A has been mounted to the vehicle body 1A (see FIG. 5).

FIG. 8 shows a state of the lip portion 23A indicated by the dotted line of FIG. 9, i.e., a state in which the lip portion 23A is not in abutment with the front face side of the virtual front glass 3A indicated by the double-dotted chain line. FIG. 8 also shows a displacement quantity of displacement of the rear end part 23aA of the lip portion 23A as a lap interval 27A, when the lip portion 23A is in abutment with the front face side of the front glass 3A.

As shown in FIGS. 8 and 9, the respective thickness of the general plate thickness portion 20A, the lip portion 23A, and the thin portion 21A is thinly constructed in sequential order of the general plate thickness portion 20A, the lip portion 23A, and the thin portion 21A. In addition, on the presupposition that a virtual extension face is formed when the front face side of the lip portion 23A is extended to that of the general plate thickness portion 20A in excess of the thin portion 21A, the general plate thickness portion 20A and the lip portion 23A are formed so that the virtual extension face becomes a step height face, thickness of which is thinner than that on the surface of the general plate thickness portion 20A.

As the thin portion 21A formed at a boundary between the general plate thickness portion 20A and the lip portion 23A, the sectional shape in the longitudinal direction of the vehicle body 1A (see FIG. 5) is formed as an arc-like curved face 22A. In addition, as shown in FIG. 7, the shape in the widthwise direction of the thin portion 21A is constructed in an elongated groove shape formed along the vehicle widthwise direction of the cowl-top cover 2A.

The shape in the vehicle widthwise direction of the glass opposite face 25A formed at the back face side of the general plate thickness portion 20A, the thin portion 21A, and the lip portion 23A, is constructed in a shape taken along the curved-face shape in the vehicle widthwise direction of the front end part of the front glass 3A.

As shown in FIG. 8, when the cowl-top cover 2A is mounted to the vehicle body 1A (see FIG. 5), the front end part of the front glass 3A can be held between the glass opposite face 25A at the engaging portion 11A and the glass catching claw 26A. At this time, as shown in FIG. 9, the lip portion 23A is elastically deformed from the state indicated by the dotted line to the state indicated by the solid line.

When the lip portion 23A is elastically deformed to come into intimate contact with the front end part of the front glass 3A, the glass opposite face 25A and the thin portion 21A are elastically deformed, respectively. At this time, the lip portion 23A is thinly formed in comparison with the general plate thickness portion 20A, and the back face side of the lip portion 23A is constructed as part of the step-free glass opposite face 25A. With this construction, the lip portion 23A can be elastically deformed while being entirely deformed all over the lengthwise direction of the lip portion 23A in the longitudinal direction of the vehicle body 1A (see FIG. 5).

At the same time, the thin portion 21A is also elastically deformed in a direction in which the curvature of the arc-like curved face 22A is reduced, and a displacement quantity at the site of the thin portion 21A connected to the lip portion 23A can be increased. Further, both of the lip portion 23A and the thin portion 21A can be significantly elastically deformed, so that even if the rear end part 23aA of the lip portion 23A is deformed to an extent required to bring the lip portion 23A into contact with the front end part of the front glass 3A, whitening is disallowed to occur at the engaging portion 11A.

As indicated by the solid line of FIG. 9, the rear end part 23aA of the lip portion 23A is elastically deformed to be thereby able to come into intimate contact with the front end part of the front glass 3A. Moreover, in a state in which the rear end part 23aA of the lip portion 23A is elastically deformed to come into intimate contact with the front end part of the front glass 3A, a site at which whitening occurred with the engaging portion 11A is disallowed to exist, so that even if there exists a site at which whitening occurred, the whitening at that site merely slightly occurs. Therefore, the elastic force at the rear end part 23aA of the lip portion 23A can be maintained so as to be thereby able to prevent lowering of the physical value in the resin material.

If there arises a situation such that a gap is formed between the rear end part 23aA of the lip portion 23A and the front end part of the front glass 3A due to any reason, this gap is closed due to the resilience exerted by the elastic force at the rear end part 23aA of the lip portion 23A. Therefore, it is possible to prevent an occurrence of a situation in which an unclosed gap exists as it is, and it is possible to prevent the appearance of the cowl-top cover 2A from being degraded.

In this manner, the intimacy between the rear end part 23aA of the lip portion 23A and the front end part of the front glass 3A can be remarkably improved. In addition, even if the front glass 3A vibrates due to an adverse effect or the like arising from the vehicle body 1A (see FIG. 5) or even if the cowl-top cover 2A vibrates, the elastic force at the lip portion 23A is maintained to be thereby able to prevent an occurrence of chatter at the lip portion 23A.

Noise or the like generated between the lip portion 23A and the front glass 3A can be restrained, and noise vibration proofing performance can be improved. Further, at the time of vehicle washing or the like as well, the lip portion can be prevented from being curled-up so as to be thereby able to prevent the appearance of the cowl-top cover 2A from being impaired.

As has been described so far, the present invention is capable of: preventing the lowering of the physical value due to whitening of a synthetic resin constituting the cowl-top cover 2A; and maintaining the intimate contact state between the front glass 3A and the lip portion 23A over a long period of time. Further, the appearance of the cowl-top cover 2A can be appropriately maintained over a long period of time.

(Fourth Embodiment)

Figure 10A:
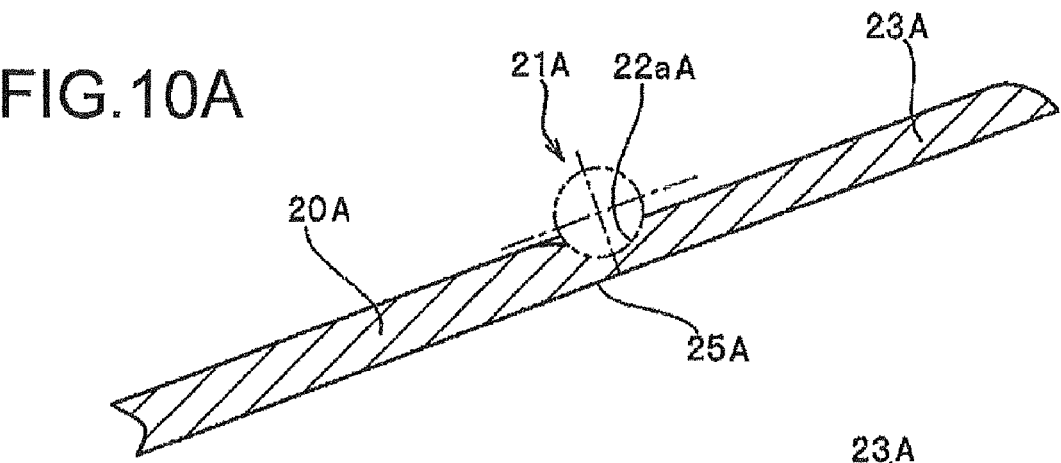
FIGS. 10A to 10C are enlarged sectional views of essential portions, showing modified examples of a thin portion, according to a fourth embodiment.
Figure 10B:
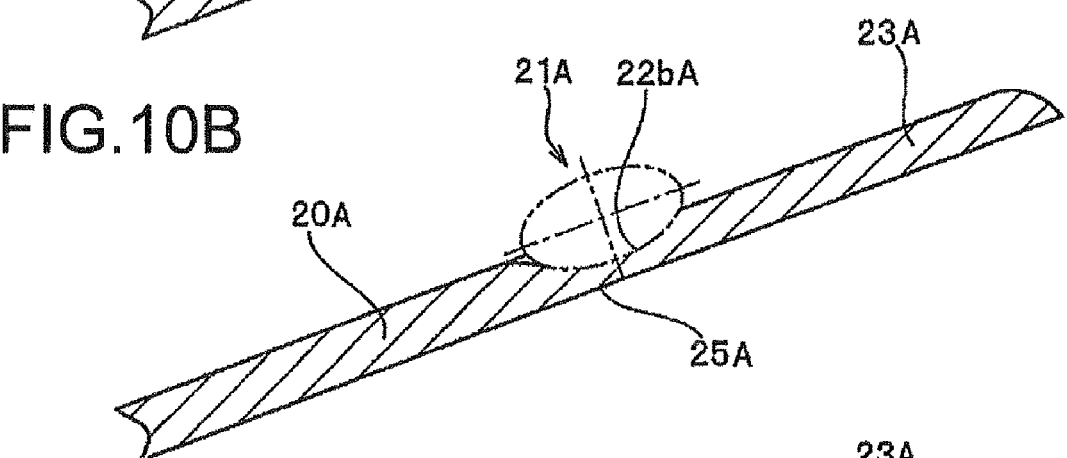
Figure 10C:
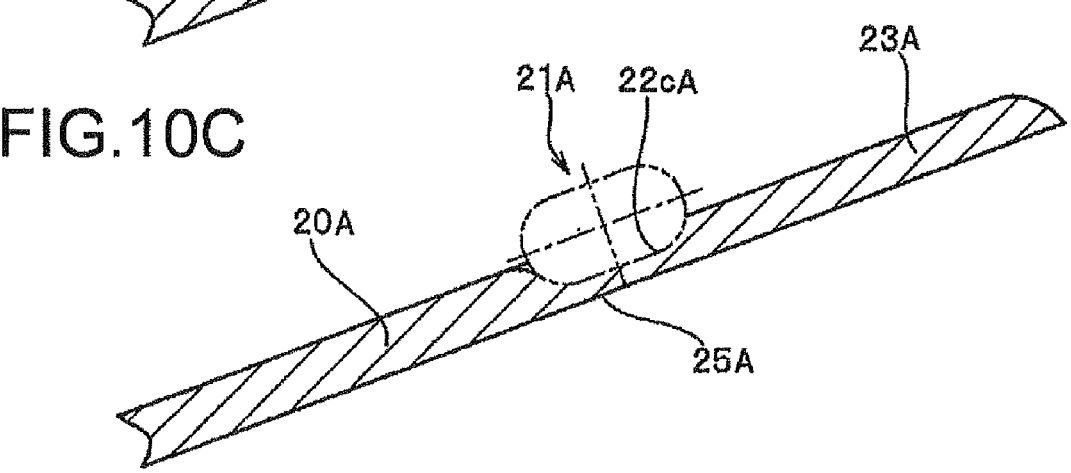

FIGS. 10A to 10C each show an enlarged sectional view of essential parts of the sites arranged at the front face side of a front glass 3A made of a general plate thickness portion 20A, a thin portion 21A, and a lip portion 23A. FIGS. 10A to 10C each also show a modified example of an arc-like curved face 22A (see FIG. 6) which is formed in a sectional shape of the thin portion 21A in the longitudinal direction of a vehicle body (see FIG. 5).

FIG. 10A shows an example of a construction in which a perfect-circle arc face 22aA is formed as an arc-like curved face 22A (see FIG. 6). As shown in FIG. 10A, by forming the perfect-circle arc face 22aA, where a lip portion 23A is elastically deformed when a cowl-top cover 2A is mounted to the vehicle body 1A (see FIG. 5), a bending moment applied to the thin portion 21A can be accepted by the entirety of the arc face 22aA so as to reduce a curvature radius on the perfect-circle arc face 22aA. Therefore, a concentrative stress is not applied to a partial site of the thin portion 21A so as to be thereby able to prevent an occurrence of whitening at the thin portion 21A.

FIG. 10B shows an example of a construction in which an elliptical arc face 22bA is formed as an arc-like curved face 22A (see FIG. 6). As shown in FIG. 10B, the elliptical arc face 22bA is formed so as to thereby have a larger area in a long-axis direction of an ellipse than that in the case of perfect-circle arc face 22aA. In this manner, a bending moment applied to the thin portion 21A can be accepted in a further large area.

Even in a case where a smaller stress than that acting on the thin portion 21A in the case where the sectional shape of the thin portion 21A is formed as the perfect-circle arc face 22aA is acted on the thin portion 21A as an elliptical arc face 22bA, an identical displacement quantity can be employed as an elastic displacement quantity at the lip portion 23A side of the thin portion 21A. Therefore, even in a case where a small stress acts on the thin portion 21A, an elastic displacement quantity at the thin portion 21A can be sufficiently obtained so as to be thereby able to further reliably prevent an occurrence of whitening.

FIG. 10C shows an example of a construction in which a horizontal-oblong arc face 22cA is formed as an arc-like curved face 22A (see FIG. 6). As shown in FIG. 10C, a horizontal-oblong arc face 22cA is formed so as to be thereby able to have a larger area in a longitudinal direction than that in the case of the elliptical arc face 22bA. In this manner, the bending moment applied to the thin portion 21A can be accepted in a further large area.

Even in a case where a smaller stress than that acting on the thin portion 21A in a case where the sectional shape of the thin portion 21A is formed as an elliptical arc face 22bA is acted on the thin portion 21A as a horizontal-oblong arc face 22cA, an identical displacement quantity can be employed as an elastic displacement quantity at the lip portion 23A side of the thin portion 21A. Therefore, even in a case where a small stress acts on the thin portion 21A, an elastic displacement quantity at the thin portion 21A can be sufficiently obtained so as to be thereby able to further prevent an occurrence of whitening. The horizontal oblong is inclusive of the shape of an ultra-ellipse.

(Fifth Embodiment)

Figure 11A:
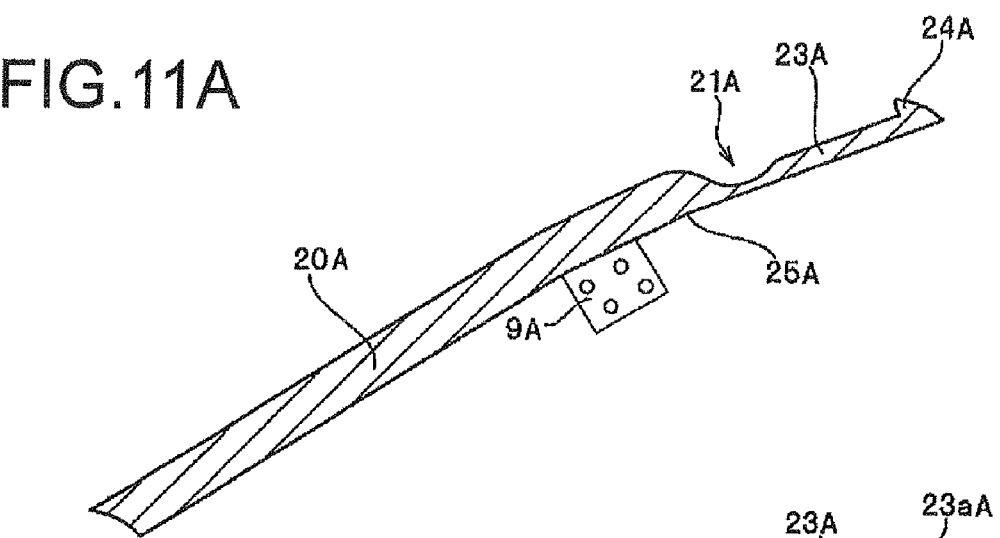
FIGS. 11A and 11B are enlarged sectional views of essential parts, showing modified examples of the lip portion, according to a fifth embodiment.
Figure 11B:
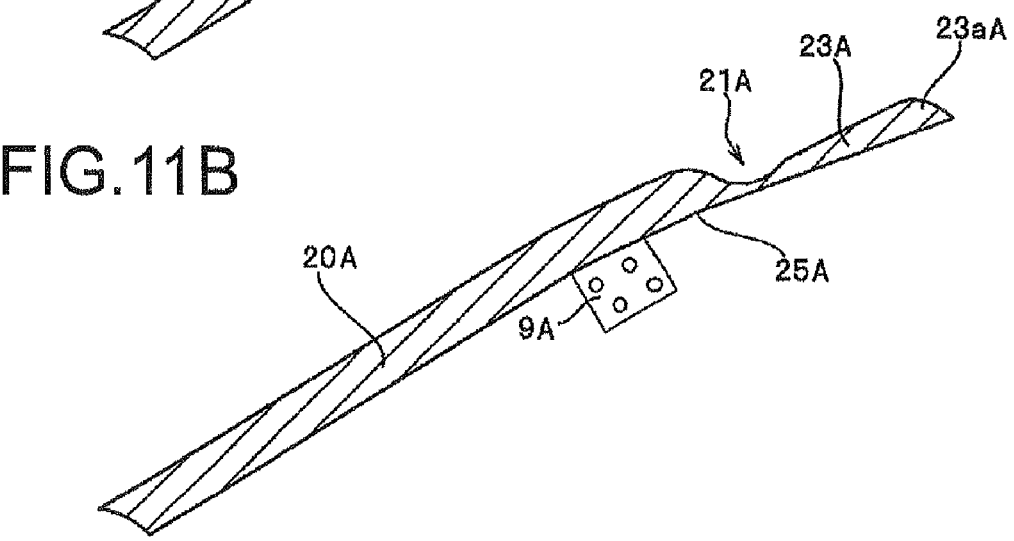
Figure 12:
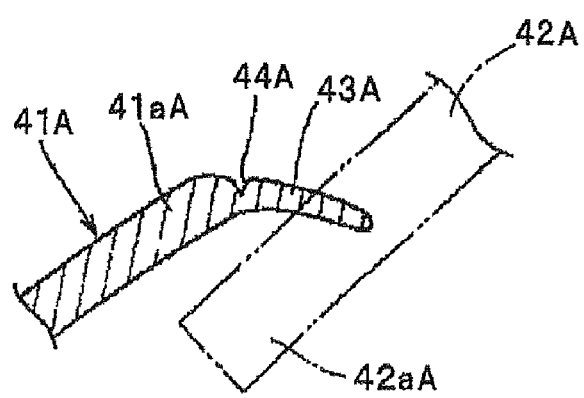
FIG. 12 is a sectional view of essential parts, showing a state before a molded portion is engaged with a windshield, according to the related art.

FIGS. 11A and 11B each show enlarged sectional views of essential parts of the sites arranged at the front face side of a front glass 3A made of a general plate thickness portion 20A, a thin portion 21A, and a lip portion 23A. FIGS. 11A and 11B each show modified examples according to the sectional shape of a lip portion 23A in the longitudinal direction of the vehicle body 1A (see FIG. 5).

While, in the sectional shape shown in FIGS. 11A and 11B, a perfect-circle arc face shape is illustrated as the sectional shape of the thin portion 21A, the sectional shape as shown in FIGS. 10A to 10C of the fourth embodiment can be formed in the sectional shape of the thin portion 21A. In the fifth embodiment as well, the back face of the general plate thickness portion 20A, the thin portion 21A, and the lip portion 23A is constructed as a glass opposite face 25A.

FIG. 11A shows an example of a construction in which an erected portion 24A is formed at the rear end part of the lip portion 23A. As shown in FIG. 11A, the erected portion 24A is formed at the rear end part of the lip portion 23A, whereby rigidity at the erected portion 24A can be enhanced. The rigidity at the erected portion 24A is enhanced, whereby a state of intimate contact between the back face side of the erected portion 24A and the front glass 3A (see FIG. 8) can be appropriately maintained.

FIG. 11B shows an example of a construction in which the thickness on the side of the rear end part 23aA of the lip potion 23A is larger than that on the side of the thin portion 21A of the lip portion 23A. In other words, the thickness at the lip portion 23A is gradually reduced smoothly from the side of the rear end part 23aA of the lip portion 23A towards the side of the thin portion 21A of the lip portion 23A.

With such a construction, the rigidity at the rear end part 23aA of the lip potion 23A can be enhanced by the thickness on the side of the rear end part 23aA of the lip portion 23A. Moreover, the thickness on the side of the thin portion 21A of the lip portion 23A is constructed to be smaller than that on the side of the rear end part 23aA of the lip portion 23A so as to be thereby able to increase the elastic deformation quantity on the side of the thin portion 21A of the lip portion 23A.

The rear end part 23aA of the lip portion 23A is elastically deformed in accordance with the elastic deformation quantity at the thin portion 21A and the elastic deformation quantity at the lip portion 23A so as to be thereby able to bring into intimate contact with the front end part side of the front glass 3A. Moreover, when the rear end part 23aA of the lip portion 23A is elastically deformed so as to be thereby able to bring into intimate contact with the front end part side of the front glass 3A, an occurrence of whitening at the thin portion 21A can be prevented.

With the construction as shown in FIG. 11B, a state of intimate contact between the back face side at the rear end part 23aA of the lip portion 23A and the front glass 3A (see FIG. 8) can be appropriately maintained.

INDUSTRIAL APPLICABILITY

The present invention can be appropriately applied to a cowl-top cover.

What is claimed is:

1. A cowl-top cover, which is arranged across a lower end part of a front window panel, a rear end part of a front hood, and an upper end part of a dash panel, of a vehicle, the cowl-top cover comprising:

a seal loading portion supporting the rear end part of the front hood with a sealing member;

a longitudinal wall portion formed so as to extend downwardly from a rear end part of the seal loading portion; and a panel loading portion supported at the upper end part of the dash panel, wherein the longitudinal wall portion includes:

a first oblique face portion formed at a predetermined angle at a rear portion side on a basis of a perpendicular line with the rear end part of the seal loading portion being a start point; and a second oblique face portion bent and formed at a front side of the first oblique face portion.

2. The cowl-top cover according to claim 1, wherein the longitudinal wall portion is uniform in a vertical dimension between the rear end part of the seal loading portion and a bent part of the first oblique face portion and the second oblique face portion.

3. The cowl-top cover according to claim 1, wherein the second oblique face portion is 80 degrees or more and 100 degrees or less relative to the first oblique face portion.

* * * * *